(12) United States Patent
McCullagh (10) Patent No.: US 11,671,486 B1
(45) Date of Patent: Jun. 6, 2023

(54) MANAGING AVAILABILITY ZONE UTILIZING REDUNDANCY VALIDATION

(71) Applicant: Amazon Technologies, Inc., Seattle, WA (US)

(72) Inventor: Gavin Derek McCullagh, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/444,265

(22) Filed: Aug. 2, 2021

(51) Int. Cl.
*H04L 67/1034* (2022.01)
*H04L 67/1025* (2022.01)
*H04L 67/1012* (2022.01)

(52) U.S. Cl.
CPC ...... *H04L 67/1034* (2013.01); *H04L 67/1012* (2013.01); *H04L 67/1025* (2013.01)

(58) Field of Classification Search
None
See application file for complete search history.

(56) References Cited

U.S. PATENT DOCUMENTS

| 9,055,067 | B1* | 6/2015 | Ward, Jr. | G06Q 10/06 |
| 2016/0085643 | A1* | 3/2016 | McAlister | G06F 11/203 714/4.12 |
| 2016/0125465 | A1* | 5/2016 | Kulkarni | G06F 3/0484 705/14.57 |
| 2019/0089776 | A1* | 3/2019 | Stolorz | H04L 67/1034 |
| 2020/0389411 | A1* | 12/2020 | Yang | H04L 47/20 |
| 2021/0036957 | A1* | 2/2021 | Kuang | H04L 43/0823 |

* cited by examiner

*Primary Examiner* — Joshua Joo
(74) *Attorney, Agent, or Firm* — Knobbe Martens Olson & Bear LLP (57) ABSTRACT

The present disclosure generally relates to managing redundancy capacity in a region having a plurality of active availability zones. For individual regions, a load balancing component can implement a redundancy validation routine that includes a non-uniform distribution of load for a set of active availability zones such that one availability zone receives an increase in traffic corresponding to the likely increase that would be experienced in response to an availability zone failure. The network service can perform automatic remediation.

21 Claims, 6 Drawing Sheets

MANAGING AVAILABILITY ZONE UTILIZING REDUNDANCY VALIDATION

BACKGROUND

Network-based computing, in general, is an approach to providing access to information technology resources through services, such as Web services, where the hardware or software used to support those services is dynamically scalable to meet the needs of the services at any given time. In network-based computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of webservers streaming content to users scale up to meet bandwidth requirements during peak viewing hours, and then scale back down when system usage is lighter.

A client typically will rent, lease, or otherwise pay for access to the elastic resources accessed through network service, and thus does not have to purchase and maintain the hardware and/or software that provide access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

In network-based computing, locations in which applications may be hosted and/or partitioned may be described as regions and/or availability zones. Each region comprises a separate geographic area from other regions and includes multiple, isolated availability zones. Each region may be isolated from all other regions in the network-based computing system. An availability zone is an isolated location inside a region. Each region is made up of several availability zones that each belong to a single region. Also, each availability zone is isolated, but the availability zones in a particular region are connected through low-latency links. When an application is distributed across multiple availability zones, instances may be launched in different availability zones to enable an application to maintain operation if one of the instances fails (for example, by allowing another instance in another availability zone to handle requests for the application).

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to the management of network services. In the network-based computing system, customers can design applications that are partitioned across various isolated computing systems (referred to as "availability zones" or regions). When partitioned as such, each of the various zones or regions hosts a partition of the applications identical to the other partitions of the applications. In one embodiment, a single availability zone may be designated as an "active' or "primary" availability zone, which receives a full amount of application requests. In other embodiments, the network services may be configured in a manner that two or more availability zones are designated as "active" or "primary." In such embodiments, the network services can utilize some form of load balancing or request distribution mechanism to distribute application requests based on the number of active availability zones. The plurality of "active" availability zones or active nodes may be logically associated within a single region.

In the unlikely event that one of the zones or regions fails, the partitions of the applications hosted by the other active availability zones \provide redundancy or failover, allowing the applications to continue running based on the resources in the other active availability. More specifically, aspects of the present disclosure relate to validating the capacity and capability of network-based services that enable predictable, controlled, and reliable failover by remaining active availability zones or availability nodes within a defined region. In accordance with aspects of the present application, a network service can configure non-uniform distribution of load for a set of active availability zones within a region (or other grouping of active availability zones) while all the availability zones have not experienced a failover event. The non-uniform distribution illustratively corresponds to a set of routing weights for a load balancing mechanism that anticipates likely increases in processing load subsequent to a failover event. The network service can then measure performance metrics to validate redundancy capabilities of the configuration and implement additional remediation techniques.

The remediation process can illustratively be implemented manually or automatically and can be customized to allow for one or more failover zones to achieve a characterization of available. When such a failure of one application partition does not obstruct operation of the application in other partitions, or negatively impact the data integrity of data associated with the application (i.e., when a failover workflow ensure that network requests, etc., are appropriate transitioned or directed to a backup partition), the application is said to be highly available because the partitions enable the application to be available more often than not.

Existing mechanisms for managing failovers are overly complicated, significantly increase design work required by customers, and lack features that provide the customer visibility and control over the mechanisms. The present disclosure addresses such problems by providing a system for managing network-based services that better coordinates failover workflow design for a set of availability zones and execution while maintaining data integrity of the data associated with the application partitions to enable highly available applications.

The network-based services of the present disclosure improve upon the faults of the existing mechanisms in various ways. The system for managing network services of the present disclosure enables customers to validate redundancy capabilities based on actual measured performance and to manually remediate unavailable availability zones so that they meet the requirements to be considered available in the event of a failover. As described above, some embodiments, the network-based service automatically remediates failures in active availability zones based upon certain readiness requirements set by a client. The system for managing networks services informs a client of the available zones within a region or multiple regions, which can be specifically identified or characterized based upon custom rules provided by the user.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only, and are not intended to be limiting.

Figure 1A:
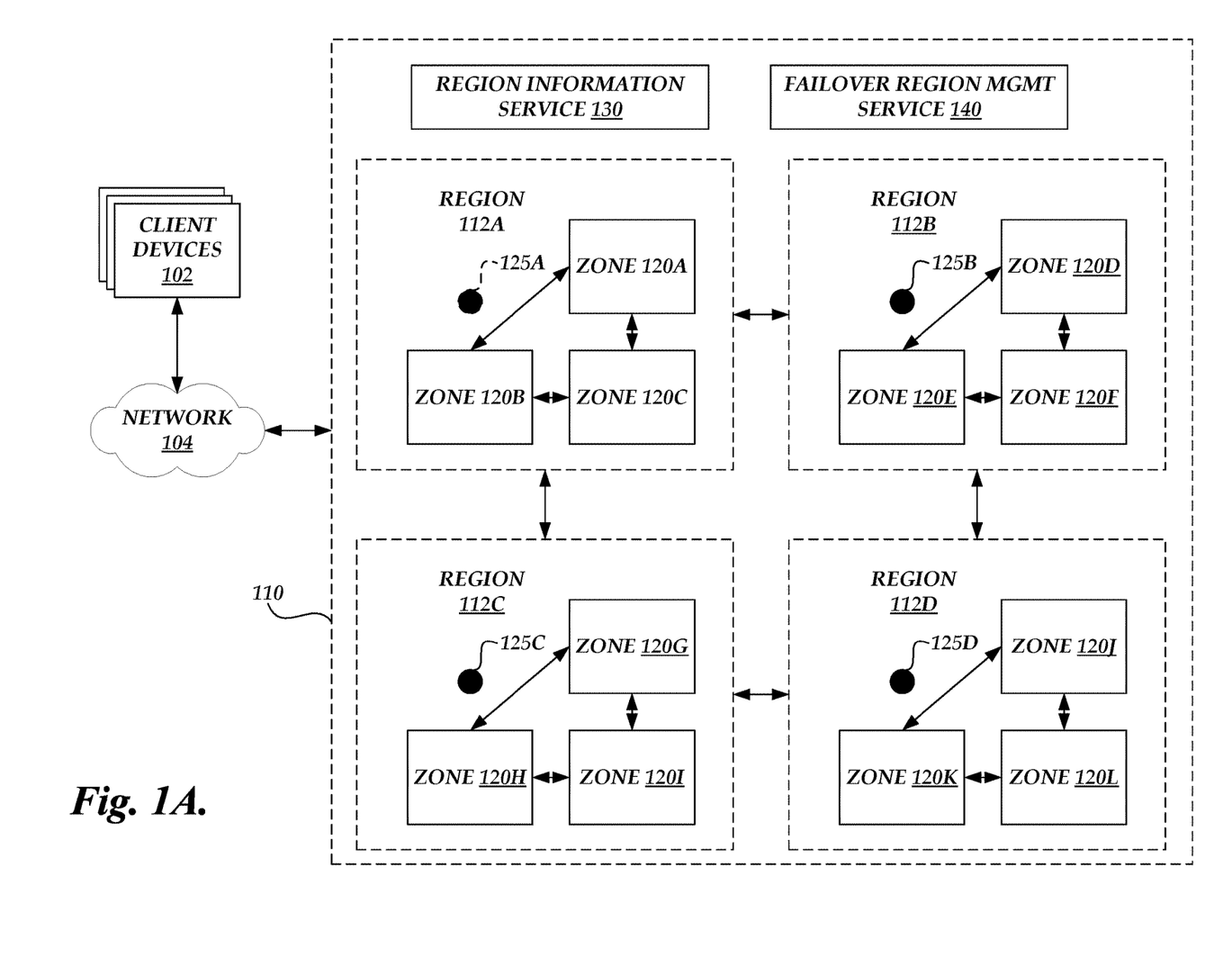
FIG. 1A depicts a schematic diagram of a network service provider in which various embodiments according to the present disclosure can be implemented.

FIG. 1A depicts an example computing environment 100 in which a network service provider 110 provides network-based services to client devices 102 via a network 104. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1A, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1A, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1A, each region 112 is further shown as divided into a number of zones 120 (across all regions 112, zones 120A-L), which may also be referred to as availability zones or availability nodes. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using storage resources, processing resources, and communication links in that zone 120. Restricting inter-zone cloud or network-based computing operations may limit the "blast radius" of any failure within a single zone 120, decreasing the chances that such a failure inhibits operation of other zones 120. Illustratively, services provided by the network service provider 110 may generally be replicated within zones 120, such that a client device 102 can (if they so choose) utilize the network service provider 110 entirely (or almost entirely) by interaction with a single zone 120.

As shown in FIG. 1A, each zone 120 is in communication with other zones 120 via the communication links. Preferably, the communication links between the zones 120 represent high speed, private networks. For example, zones 120 may be interconnected via private fiber optic lines (or other communication links). In one embodiment, the communication links between zones 120 are dedicated entirely or partially to inter-zone communication, and are separated from other communication links of the zone(s). For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1A as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based services 110. Information provided to one of the endpoints 125 may be propagated to all other endpoints 125. Each region 112 may include more than one endpoint 125 or each region 112 may not include even one endpoint 125. As will be described in greater detail, in embodiments in which more than one availability zone 120 or node is designated as a primary zone, each endpoint 125 can also implement load balancing functionality to allocate requests from client devices 102. The load balancing functionality can illustratively be in the form of a distribution algorithm, such as a nominal distribution algorithm that distributes requests in a uniform manner across of the designated primary zones.

With continued reference to FIG. 1A, the network service provider 110 further includes a region information processing service 130 and a failover region management service 140. As will be described in greater detail below, to implement multi-regional failover, the region information processing service 130 can be configured to determine a target set of regions that can be designated as a set of primary regions and one or more target failover region for each primary region of the set of primary regions for an individual customer or set of customers. For example, the region information processing service 130 can process customer specific criteria to determine which regions will be designated as primary regions. The region information processing service 130 can further select target failover regions based on selection criteria unique to each primary region based on selection criteria that are applicable to each of the primary regions as described herein. The failover region management service 140 can be configured to receive the target set of failover regions and characterize the availability of at least some portion of the one or more target failover regions based on application of one or more processing rules for each primary region of the set of primary regions. Illustratively, individual processing rules can correspond to an identification of a parameter and one or more thresholds associated with the identified parameter. The parameters correspond to resources configurations or performance metrics that define the ability for a target region to be considered an available failover region. The processing rules may be configured by a customer, the network service provider, or a third party. Additionally, the processing rules may be derived, in part, on the attributes or parameters of the designated primary region (e.g., matching the current attributes of a designated primary region). The failover region management service 140 can further implement a processing engine that can implement processes responsive to a determined list of available or unavailable failover regions. The processing engine can illustratively implement one or more remediation processes that can attempt to modify or supplement target regions that were not determined as available based on the previous application of the processing rules. The processing engine can further implement readiness processes that can be utilized to determine whether the previously determined available failover regions are operationally ready or operable to function in a failover capacity. The results of the failover processes (e.g., remediation or readiness processing) can be utilized to modify or update the list of available failover regions for each of the primary regions.

Client computing devices 102 can include any network-equipped computing device, for example desktop computers, laptops, smartphones, tablets, e-readers, gaming consoles, and the like. Users can access the network service provider 110 via the network 104 to view or manage their data and computing resources, as well as to use websites and/or applications hosted by the network service provider 110. For example, users may access an application having a partition hosted by a zone 120A in the region 112A (for example, a primary) and a zone 120L in the region 112D (for example, a secondary partition).

Figure 1B:
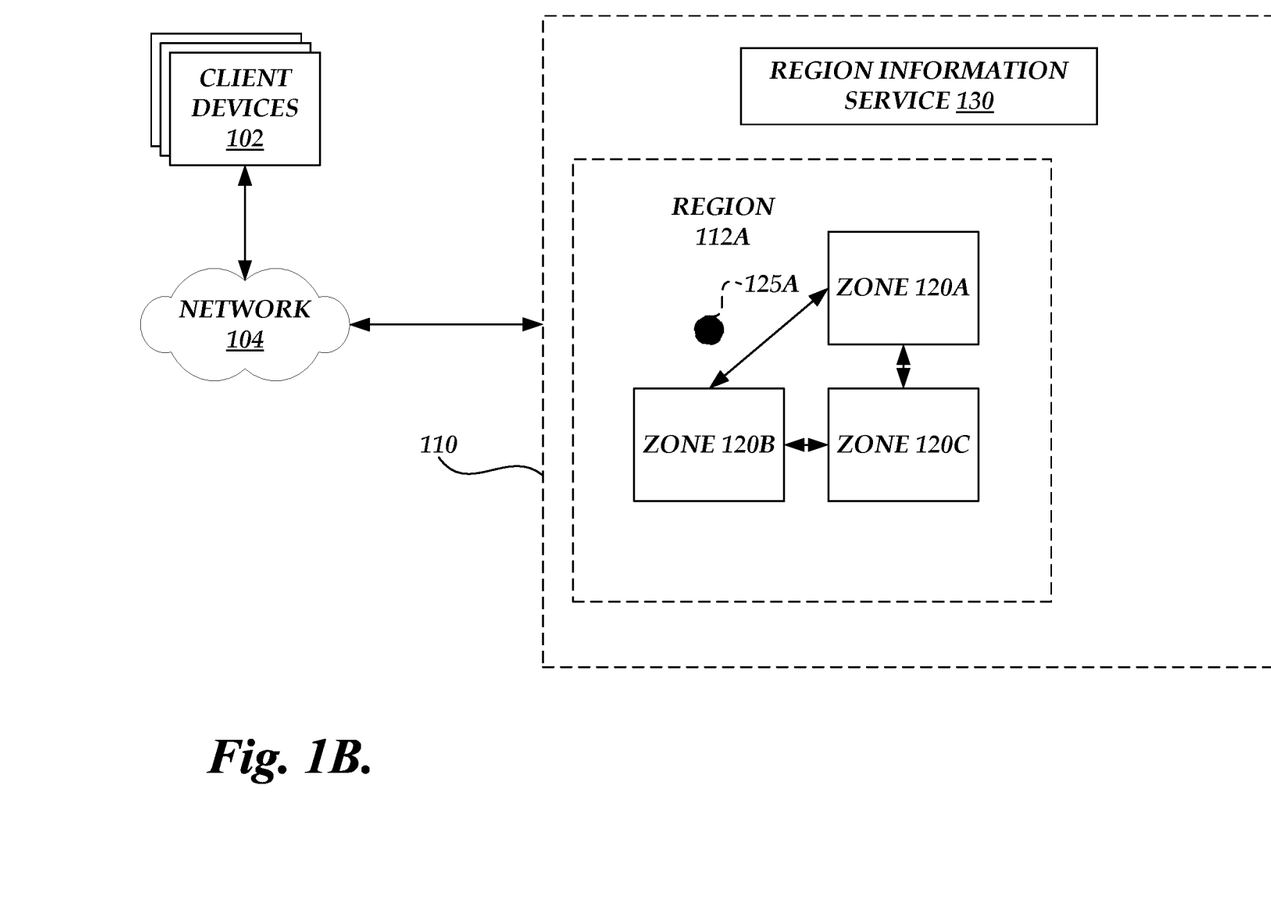
FIG. 1B depicts a subset of the schematic diagram of a network service provider of FIG. 1A illustrating the configuration and management of a plurality of active nodes which various embodiments according to the present disclosure can be implemented.

With reference now to FIG. 1B, in one embodiment, within any individual region (or other logical grouping of availability zones), such as regions 112A-112D, the application having partitions hosted in different active availability zones may be able to withstand a failure in one of the zones 120 in which one of the partitions is operating. For example, with reference to FIG. 1B, assume that 112A is configured with zones 120A, 120B and 120C as designated primary or active zones. If a primary partition hosted in zone 120A experiences a failure, any requests that would normally be allocated in a manner that would include zone 120A may be instead routed to and handled by the additional primary zones, 120B and 120C within the region. With reference to this example, assume that the nominal allocation of requests to the three primary zones in Region 112A implemented by the endpoint 125A corresponds to a uniform distribution of 33.3% of all requests. Upon the failure of a zone (e.g., zone 120A, the endpoint 125A would then implement a failover allocation such that the two remaining active zones 120B and 120C would illustratively receive an equal distribution of 50% of all requests. This would result in an increase of request traffic of approximately 17%.

With continued reference to the illustrative example, the three zones 120A, 120B and 120C may be initially configured with processing resources or other configurations such that each individual zone 120 is considered capable of accepting the increase of requests in the event of a failure event of another zone with the region 112A. In some scenarios, the performance or capabilities of the zones 120 to accept additional traffic may degrade over time, such as based on configuration changes after the initial configuration, changes to the network 110 or based on additional resource consumption from other applications or services being hosted on the zones. Additionally, in other embodiments, an initial configuration of the individual zones 120A, 120B, and 120C may be based on pre-production environment and settings and may not be reflective of processing capabilities in a production environment.

Accordingly, in accordance with aspects of the present application, the endpoint 125A, or other management component, may continuously implement a redundancy validation routine that can verify the capabilities of zones to receive an increase of traffic. Illustratively, the redundancy validation routine is illustratively implemented in a nontesting, production environment in a manner that does not require emulating a failure event on one zone. More specifically, the endpoint 125A can implement a non-uniform distribution for the active availability zones such that one active availability zone receives an allocation that would correspond to the increase in requests attributable to a failure event and such that allocations to the remaining zones would be adjusted to a lesser, non-zero allocation.

Subsequent to the implementation of a configuration of the network services, In some embodiments, individual endpoints 125 within a region can implement a redundancy validating routine to determine or otherwise validate the capacities of the designated primary zones within a region to locally failover. Illustratively, the redundancy validating routine is implemented prior to any designated region experiencing a failover event involving the unavailability or diminished capacity of an active availability zone 120 and without having to emulate a failure event at any individual availability zone. Additionally, the redundancy validating routine is illustratively implemented during actual implementation of the network service, as opposed to in a testing or laboratory environment.

Figure 2:
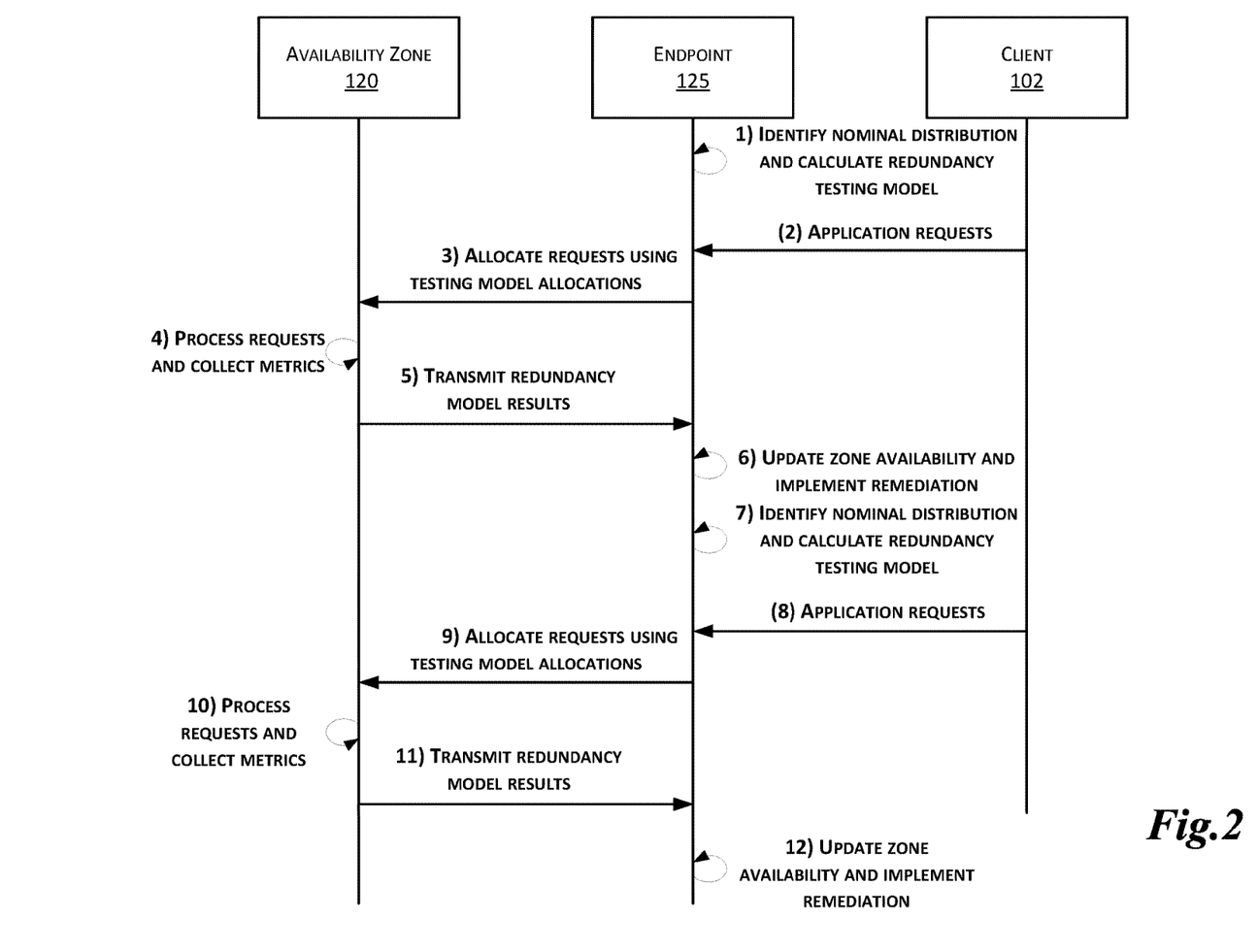
FIG. 2 depicts an example workflow of interactions that manage the validation of redundancy capabilities of a plurality of active nodes in a network service provider environment.

With reference now to FIG. 2, an exemplary workflow of interactions that manage the validation of redundancy capabilities of a plurality of active nodes in a network service provider environment will be described. As illustrated in part in FIG. 2, the redundancy validating routine will be periodically repeated by the endpoint 125 in a manner to identify degrading capabilities of a set of availability zones. At (1), the endpoint 125 identifies the nominal distribution and calculates a redundancy testing model. Illustratively, the redundancy testing model corresponds to a non-uniform distribution of routing weights used by a load balancing component to route traffic to the designated primary or active regions. The non-uniform distribution is determined in a manner that correlates to the anticipated additional load at least one region would experience in the event of a failover event.

Table 1 is an illustration of an embodiment in which three availability zones are designated as primary zones. As illustrated in first row, under a nominal configuration, each of the availability zones would be allocated a uniform distribution of 33%. In the event of a failover event, one of the availability zones would be immediately reduced to a distribution of 0% and the remaining to availability zones would be required to assume 50% of the load (e.g., a splitting the increased load previously allocated to the availability zone having a failover.) In accordance with the present application, to validate the capability of the availability zones to successfully process the increased load, a non-uniform distribution is associated so that one availability zone is given a 50% load, while the remaining two availability zones are reduced to 25% and 25%. In this embodiment, no availability zone is given a 0% load (e.g., emulating a failover event). This presents other benefits that all the availability zones continue to remain active and in full service throughout the entire validation routine. For purposes of the present application, the allocation of the non-uniform distribution among the availability zones is illustrative and the non-uniform distribution is not required strictly as illustrated in Table 1.

TABLE 1

| | Availability Zone 1 | Availability Zone 2 | Availability Zone 3 |
|---|---|---|---|
| Nominal Scenario | 33 | 33 | 33 |
| Failure Scenario | 50 | 0 | 50 |
| Validation Routine | 50 | 25 | 25 |

Table 2 is an illustration of an embodiment in which four availability zones are designated as primary zones. As illustrated in first row, under a nominal configuration, each of the availability zones would be allocated a uniform distribution of 25%. In the event of a failover event, one of the availability zones would be immediately reduced to a distribution of 0% and the remaining to availability zones would be required to assume 33% of the load (e.g., a splitting the increased load previously allocated to the availability zone having a failover.) In accordance with the present application, to validate the capability of the availability zones to successfully process the increased load, a non-uniform distribution is associated so that one availability zone is given a 33% load, while the remaining three availability zones are reduced to 22%. In this embodiment, no availability zone is given a 0% load (e.g., emulating a failover event). This prevents presents other benefits that all the availability zones continue to remain active and in full service throughout the entire validation routine. As described above, the allocation of the non-uniform distribution among the availability zones is illustrative and the non-uniform distribution is not required strictly as illustrated in Table 2.

TABLE 2

| | Availability Zone 1 | Availability Zone 2 | Availability Zone 3 | Availability Zone 4 |
|---|---|---|---|---|
| Nominal Scenario | 25 | 25 | 25 | 25 |
| Failure Scenario | 0 | 33 | 33 | 33 |
| Validation Routine | 33 | 22 | 22 | 22 |

Table 3 is an illustration of an embodiment in which five availability zones are designated as primary zones. As illustrated in first row, under a nominal configuration, each of the availability zones would be allocated a uniform distribution of 20%. In the event of a failover event, one of the availability zones would be immediately reduced to a distribution of 0% and the remaining to availability zones would be required to assume 25% of the load (e.g., a splitting the increased load previously allocated to the availability zone having a failover.) In accordance with the present application, to validate the capability of the availability zones to successfully process the increased load, a non-uniform distribution is associated so that one availability zone is given a 33% load, while the remaining three availability zones are reduced to 19%. In this embodiment, no availability zone is given a 0% load (e.g., emulating a failover event). This prevents presents other benefits that all the availability zones continue to remain active and in full service throughout the entire validation routine. As described above, the allocation of the non-uniform distribution among the availability zones is illustrative and the non-uniform distribution is not required strictly as illustrated in Table 3.

TABLE 3

|  | Availability Zone 1 | Availability Zone 2 | Availability Zone 3 | Availability Zone 4 | Availability Zone 5 |
|---|---|---|---|---|---|
| Nominal Scenario | 20 | 20 | 20 | 20 | 20 |
| Failure Scenario | 0 | 25 | 25 | 25 | 25 |
| Validation Routine | 19 | 19 | 19 | 25 | 19 |

At (2), the endpoint 125 subsequently receives requests from clients 102 and causes the implementation of the redundancy model at (3) by allocation of the requests according to the redundancy model. At (4), the individual zones process the application requests and collect relevant performance metrics. At (5), the individual zones 120 transmit the redundancy model metrics (collected or observed). At (6), the endpoint 125 receives the performance metrics and processes the metric information. At (6), the endpoint 125 can provide information regarding the validation of the configuration of the availability zones. Additionally, as described herein, the endpoint 125 can implement additional or subsequent mitigation techniques to address any additional deficiencies identified in the redundancy testing model. As illustrated in FIG. 2, in accordance with aspects of the present application, the endpoint 125 can repeat the redundancy validating routine (e.g., as illustrated in (7)-(12)). For example, the endpoint 125 can repeat the redundancy validating routine periodically, upon occurrence of a detected change, upon request, and the like.

Figure 3:
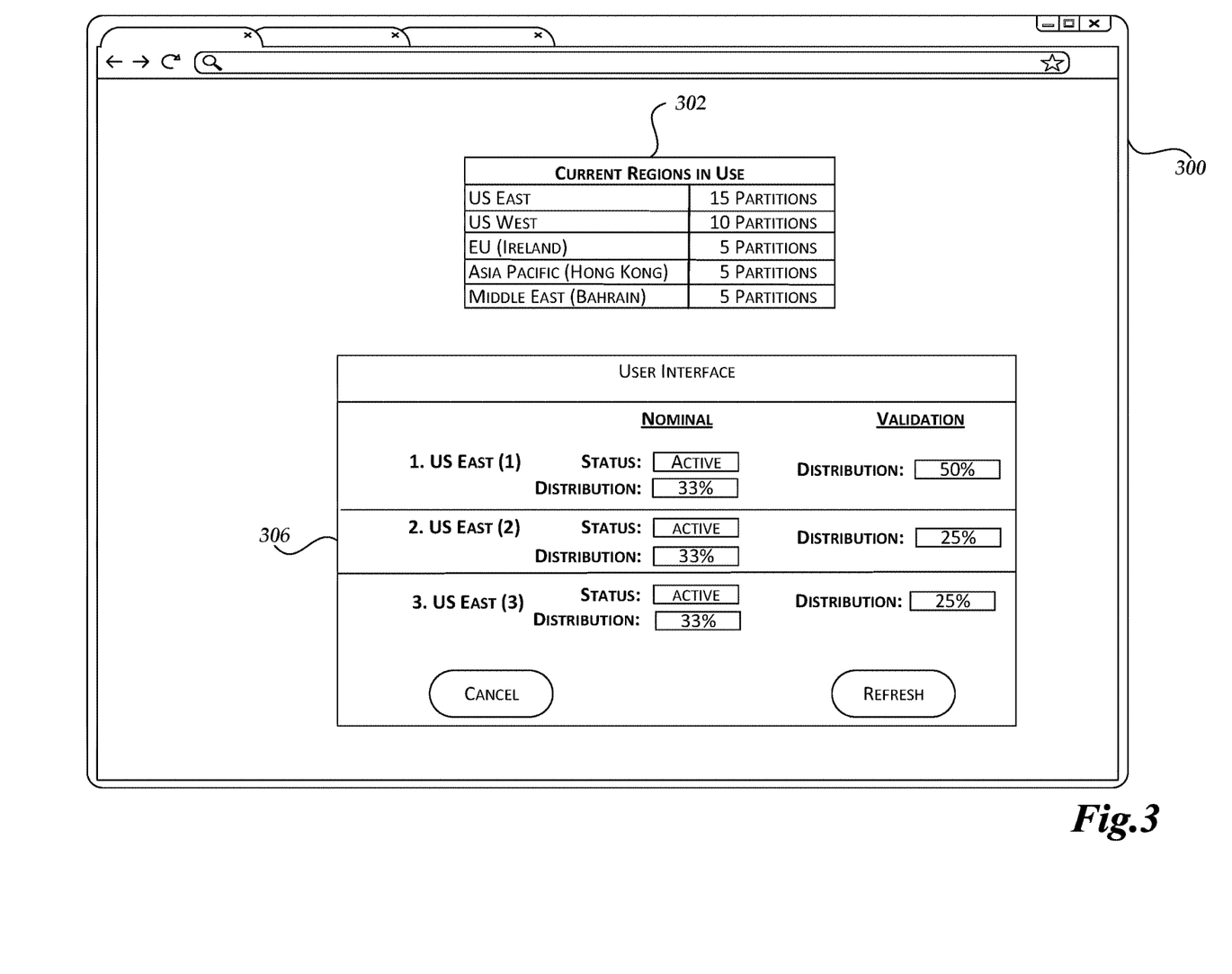
FIG. 3 depicts an example client interface that provides information regarding active node failover redundancy capabilities for a plurality of active nodes in accordance with aspects of the present application.

FIG. 3 depicts an example client interface 300 for managing a network service. The client interface 300 may enable the customers whose applications are hosted by a network service provider 110 to create dependency trees and failover workflows for their applications. The dependency trees may map and track upstream and downstream dependencies for the customer's applications to determine the steps to take in a failover to ensure data integrity between the application partitions and the continued availability of the application. Furthermore, the network service may map the upstream and/or downstream dependencies of sub-applications of the customer applications. Based on the mapped partitions and dependencies, the network service may coordinate partition or node failover in a sequential manner for any of the individual applications. In some embodiments, the dependencies may comprise other applications or services that provide data and requests.

In some embodiments, the interface 300 is also used to identify failover workflows to be triggered based on the failover states and/or other conditions. The dependency trees and the workflows may be created when the customer designs and creates the application or after the application is created and partitioned. Such dependency trees and failover workflows may enable the network service to provide visibility into particular dependencies for the application. For example, enabling the customer to see its application's upstream and downstream dependencies, the customer may better understand what sequence of steps or actions are needed during a failover of an application partition or node to ensure availability of the application and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such failover workflows may be manually triggered by the customer or automatically triggered by the network service based on the failover states of application partitions or nodes. By tracking the application dependencies and corresponding workflows, the network service may enable customers to orchestrate failover procedures for applications in a safe, reliable, and predictable manner that maintains data integrity and application availability.

In some embodiments, the customer models their application and/or cells of their application using the network service. The cells, as used herein, may represent partitions, nodes, or any unit of the application that could be a point of or experience a failure. The customer can use the models of the network service to define the sequence of steps needed during the failover across one or more applications based on the dependency trees and the like. For example, if the customer detects a failure in the primary partition of the application, the customer can trigger an autoscaling step to scale applications in the secondary partition, after which the customer can trigger a traffic management service to redirect client traffic to the secondary partition. Such controls enable the customer to manage distributed, multi-tier applications in a controlled, reliable, and predictable manner. In some embodiments, the traffic management service may route traffic to an optimal application endpoint based on various parameters relating to performance of the application. In some embodiments, the customer can generate the workflow to include the actions identified above in the event the failure is triggered such that the actions are performed automatically by the network service.

Similarly, the network service may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change may trigger a failover or changing of endpoint or traffic weights per zone or region for the traffic management service and/or the DNS service (also referred to herein as the routing service), which may enable automation of failover workflows and/or sequences of steps.

As described herein, the network service for the customer application may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure. Though reference herein is made to primary and secondary partitions, the network services and the failover workflow may apply equally to primary and second nodes.

FIG. 3 depicts an example client interface 300 that provides information regarding active node failover redundancy capabilities for a plurality of active nodes in accordance with aspects of the present application. The client interface 300 may include a first client interface 302 for representing the current regions being used by the client's application. The first client interface 302 may include the names of the regions that are currently being used the client's application. The first client interface 302 may also include the number of partitions currently being implemented in a certain region. The first client interface 302 may contain other information related to the one or more regions that are being actively used at one moment in time by the client. The first client interface 302 may be specific to one primary region of the client. In another embodiment, the first client interface may correspond to multiple primary regions of the clients.

The client interface 300 may include a second client interface 304 for representing information regarding the nominal distribution and validation distribution for a set of active availability zones within a region or other logical grouping. For example, the second client interface 304 may provide the name of the region or the zone, the identification of the number of active availability zones, and the nominal distribution of traffic among the active availability zones in the region. As illustrative in FIG. 3, a region "US East" includes three active availability zones, each of which received an equal distribution of traffic corresponding to an illustrative 33%. Further, the second client interface 304 may be configured to provide information related to the non-uniform distribution of traffic in accordance with aspects of the present application. For example, the active availability zone "US East (1)" can be shown to receive the increase in traffic to 50% while the remaining two active availability zones "US East (2)" and "US East (3)" receive reductions to 25%. The interface 300 can include controls for initiating or terminating validation routines and status of the determined capabilities of the active availability zones, implementation of mitigation techniques, and the like.

Figure 4:
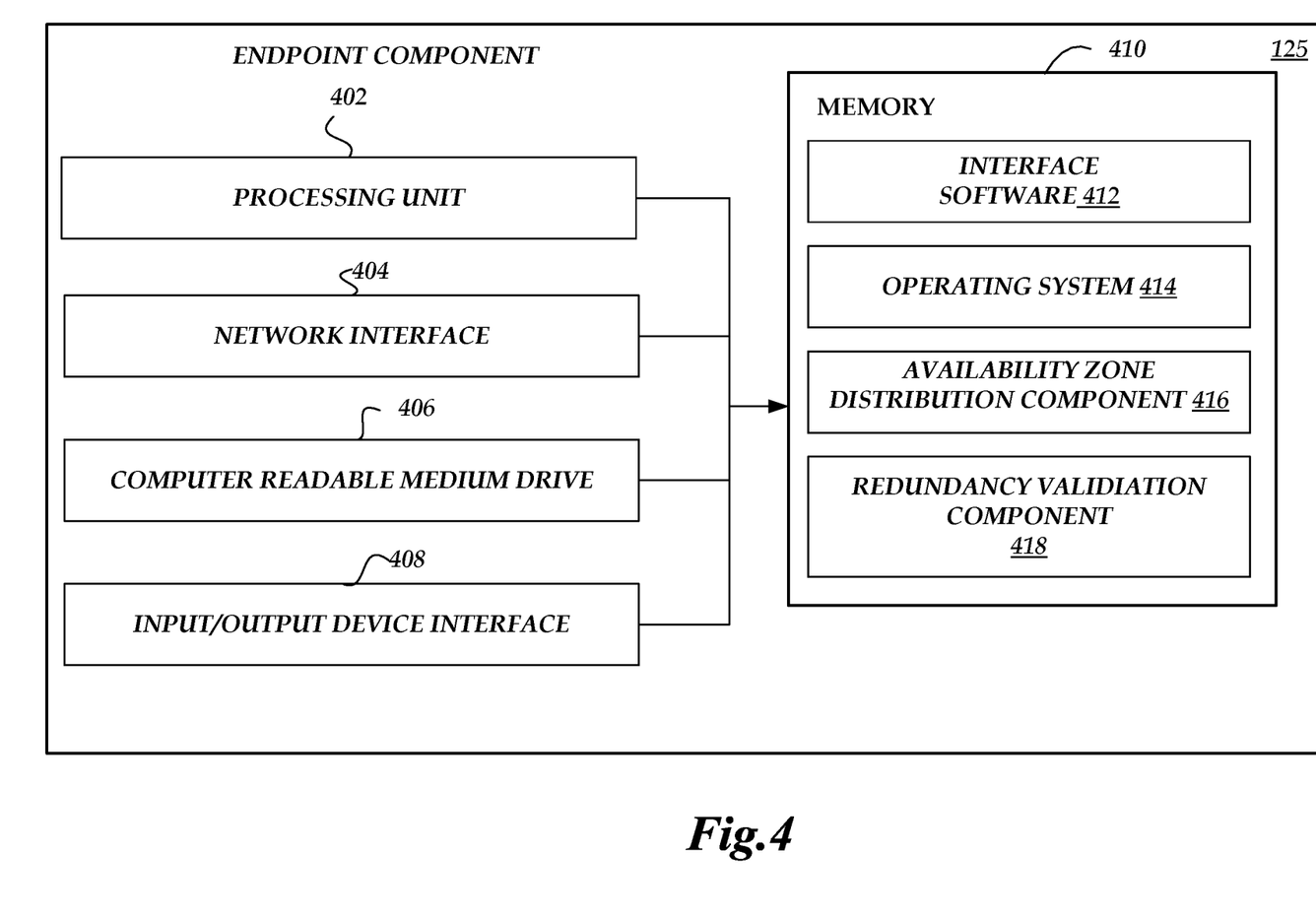
FIG. 4 depicts an example schematic diagram that implements an endpoint within a region that can implement various request distribution allocations in accordance with illustrative aspects of the present disclosure.

FIG. 4 depicts a general architecture of a computing device configured to perform the operations of the endpoint 125, such as endpoints 125A, 125B, 125C, and 125D (FIG. 1A), according to some embodiments. The general architecture of the endpoint 125 depicted in FIG. 4 includes an arrangement of computer hardware and software that may be used to implement aspects of the present disclosure. The hardware may be implemented on physical electronic devices, as discussed in greater detail below. The endpoint 125 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

As illustrated, the endpoint 125 includes a processing unit 402, a network interface 404, a computer readable medium drive 406, and an input/output device interface 408, all of which may communicate with one another by way of a communication bus. The network interface 404 may provide connectivity to one or more networks or computing systems. The processing unit 402 may thus receive information and instructions from other computing systems or services via the network. The processing unit 402 may also communicate to and from memory 410 and further provide output information for an optional display via the input/output device interface 408. The input/output device interface 408 may also accept input from an optional input device (not shown).

The memory 410 can contain computer program instructions (grouped as units in some embodiments) that the processing unit 402 executes in order to implement one or more aspects of the present disclosure. The memory 410 corresponds to one or more tiers of memory devices, including (but not limited to) RAM, 4D XPOINT memory, flash memory, magnetic storage, and the like.

The memory 410 may store an operating system 414 that provides computer program instructions for use by the processing unit 402 in the general administration and operation of the network service. The memory 410 may further include computer program instructions and other information for implementing aspects of the present disclosure. For example, in one embodiment, the memory 410 includes a user interface unit 412 that obtains requests from client devices 102 to access applications provided by a plurality of availability zones 120 within a region controlled or allocated to the endpoint 125. In addition to and/or in combination with the interface component 412, the memory 410 may further include an availability zone distribution component 416 for determining the allocation of received application requests according to one or more allocation model. The memory 410 may also include a rules redundancy validation component 418 to manage the processing of the redundancy model for testing availability zone redundancy capabilities as described herein.

Figure 5:
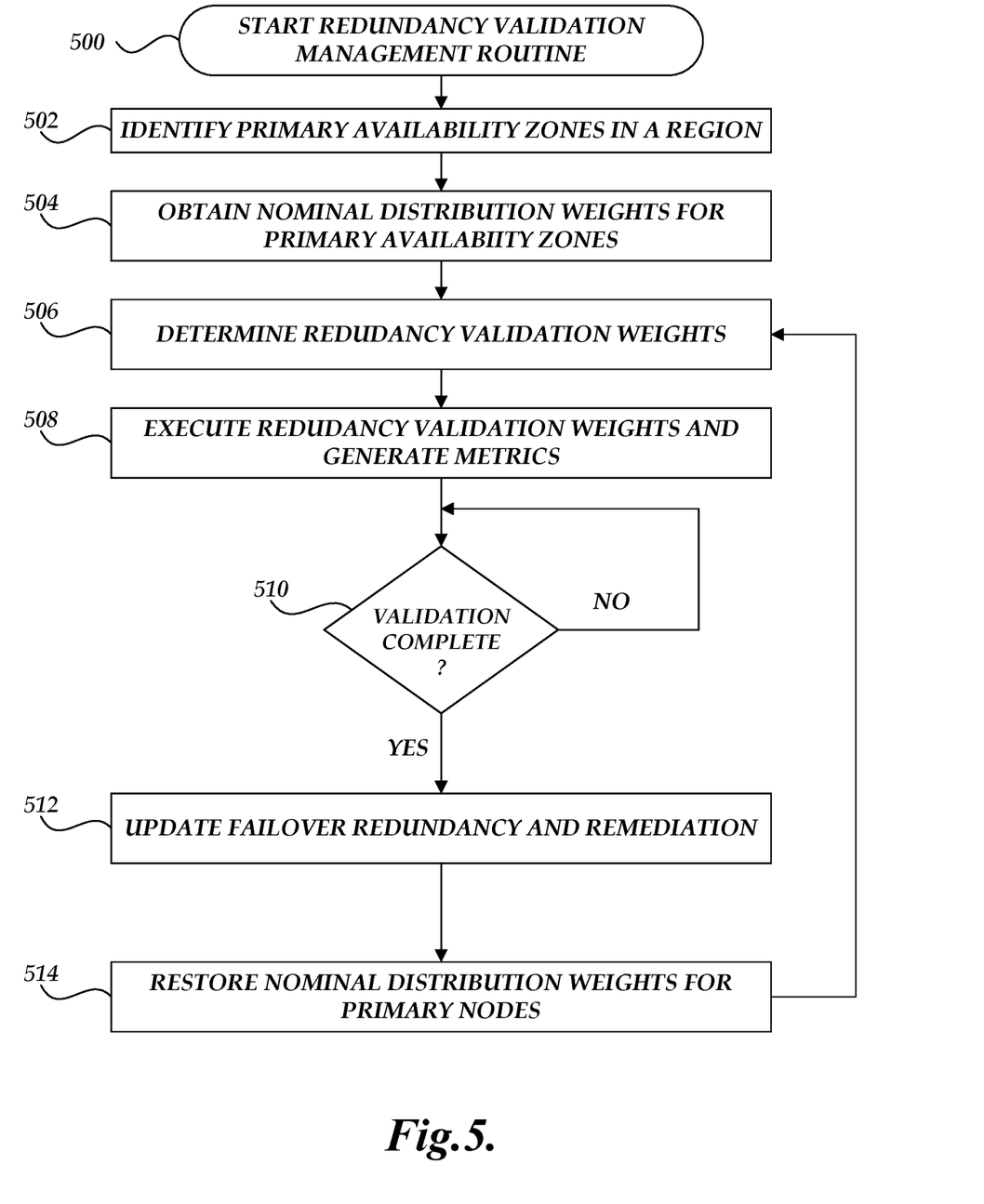
FIG. 5 is a flow diagram illustrative of a management routine for validating redundancy capabilities for a plurality of active nodes implemented by a network service provider in accordance with illustrative aspects of the present disclosure.

FIG. 5 is a flow diagram illustrative of a management routine 500 for validating redundancy capabilities for a plurality of active nodes implemented by a network service provider The routine 500 may be carried out by the endpoint 125, for example. The routine 500 may be carried out by the endpoint 125 after the initial configuration of the network services (e.g., the active or primary availability zones). As described above, after to the implementation of a configuration of the network services, the endpoint 125 can implement routine 500 to determine or otherwise validate the failover capacities of the designated primary regions. Illustratively, routine 500 is implemented prior to any designated primary region experiencing a failover event and without having to emulate a failover event at any availability zone. Additionally, routine 500 is illustratively implemented actual implementation of the network service, as opposed to in a testing or laboratory environment.

The routine 500 begins at block 502, where the endpoint 125 obtains a list of primary zones or nodes in a region The list of active availability zones or nodes may be detected by examining each region that is running a client's partitions.

The routine 500 then continues at block 504, where the endpoint 125 obtains a list of failover weight rules that corresponds to the nominal allocation of distribution of requests among availability zones that are designated as active. Illustratively, this may an equal distribution as illustrated in various examples. In other embodiments, the nominal allocation can include non-uniform distributions.

The routine 500 continues at block 506, where the endpoint 125 must obtain the redundancy model failover weights. As described above, the failover regional management service 106 calculates a redundancy testing model. Illustratively, the redundancy testing model corresponds to a non-uniform distribution of routing weights used by a load balancing component to route traffic to the designated primary or active regions. The non-uniform distribution is determined in a manner that correlates to the anticipated additional load at least one region would experience in the event of a failover event. In accordance with the present application, to validate the capability of the availability zones to successfully process the increased load, a non-uniform distribution is associated so that one availability zone is given the increased load, while the remaining two availability zones are reduced to non-zero distributions.

The routine 500 continues at block 508, where the endpoint 125 executes the redundancy failover weights and collects performance metrics. At decision block 510, a test is conducted to determine whether to the redundancy model is complete. If so, at block 512, the list of available regions can be updated with the available target failover regions. Illustratively, at that this point the endpoint 125 can request remediation for any identified deficiency or notify another service of any identified deficiency. In accordance with aspects of the present application, remediation can generally include the modification of processing configurations or resources of the availability zones 120. In one example, if the availability zones 120 are determined to have insufficient or incomplete processing configuration or resources, the network service 110 can cause the modification of the availability zones 120 to either increase the resources available to the availability zones, modification of configurations/settings or the replacement/instantiation of new availability zones with the increased processing resources. In this example, it is assumed that the processing requests or other demands on processing resources for the computing devices implementing the availability zones has increased and the availability zones do not have sufficient processing resources, inefficient or incomplete configurations, etc. to provide the necessary redundancy for the region. In another example, if the availability zones 120 are determined to have excess processing configuration or resources, the network service 110 can cause the modification of the availability zones 120 to either decrease the resources available to the availability zones, modification of configurations/settings or the replacement/instantiation of new availability zones with the decreased processing resources. In this example, it is assumed that the processing requests or other demands on processing resources for the computing devices implementing the availability zones has decreased and the availability zones have excess processing resources to provide the necessary redundancy for the region and at an increased cost to the customer. One skilled in the relevant art will appreciate that the specific technique for remediation may depend on the collected performance metrics, the identified deficiency, and client preferences/instructions. Additionally, the performance of the remediation actions can be implemented by various components of the network service 110 as illustrated in FIG. 1A.

At block 514, the endpoint 125 restores the nominal distribution weights for the primary nodes and the routine 500 repeats to block 506. As described above, routine 500 may be implemented continuously, periodically, or upon satisfaction of some selection criteria.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing availability zone resource utilization, the system comprising:
   one or more computing devices associated with a regional failover management system, wherein the regional failover management system is configured to:
      obtain a designation of a plurality of primary availability zones within a region corresponding to an identified application, wherein requests to the plurality of primary availability zones within the region are allocated according to a uniform distribution;
      obtain a non-uniform distribution allocation according to a redundancy model configured to define the non-uniform distribution allocation, wherein at least one allocation of the non-uniform distribution allocation corresponds to an anticipated load based resulting from a failover event associated with one of the availability zones of the plurality of primary availability zones and wherein all of the allocations in the non-uniform distribution allocation correspond to non-zero values;
      cause implementation of the non-uniform distribution allocation according to the redundancy model to collect performance metrics associated with the plurality of primary availability zones, wherein the implementation of the non-uniform distribution allocation according to the redundancy model is implemented prior to at least one of the plurality of primary availability zones experiencing the failover event;
      generate processing results based on the collected performance metrics; and
      perform a remediation operation response to the processing results.

2. The system of claim 1, wherein the plurality of primary availability zones corresponds to three primary availability zones, and wherein the at least one allocation corresponding to an anticipated load resulting from a failover event corresponds to 50 percent.

3. The system of claim 1, wherein the plurality of primary availability zones corresponds to four primary availability zones, and wherein the at least one allocation corresponding to an anticipated load resulting from a failover event corresponds to 33 percent.

4. The system of claim 1, wherein the plurality of primary availability zones corresponds to five primary availability zones, and wherein the at least one allocation corresponding to an anticipated load resulting from a failover event corresponds to 25 percent.

5. The system of claim 1, wherein generating processing results based on the collected performance metrics includes generating a notification regarding a characterization of validation of a configuration of the plurality of primary availability zones.

6. The system of claim 1, wherein generating processing results based on the collected performance metrics includes generating a recommendation regarding a remediation of a configuration of the plurality of primary availability zones.

7. The system of claim 1, wherein the regional failover management system further configured to:
   obtain a list of the plurality of primary availability zones;
   determine failover weight rules corresponding to the plurality of primary availability zones, wherein the failover weight rules are routing weights for distributing loads among the plurality of primary availability zones; and
   execute the failover weight rules to the plurality of primary availability zones.

8. A system for managing a plurality of primary availability zones within a defined region, the system comprising:
   one or more computing devices associated with a load balancing component, wherein the load balancing component is configured to:
      identify the plurality of primary availability zones within the defined region and corresponding to an identified application;
      cause implementation of a non-uniform distribution allocation according to a redundancy model to collect performance metrics associated with the plurality of primary availability zones, wherein the redundancy model defines the non-uniform distribution allocation, wherein at least one allocation of the non-uniform distribution allocation corresponds to an anticipated load based resulting from a failover event, and wherein the implementation of the non-uniform distribution allocation according to the redundancy model is implemented prior to at least one of the plurality of primary availability zones experiencing the failover event; and
      generate processing results based on the collected performance metrics.

9. The system of claim 8, wherein an original allocation of requests to the plurality of primary availability zones are allocated according to a uniform distribution.

10. The system of claim 8, wherein an original allocation of requests to the plurality of primary availability zones are allocated according to a non-uniform distribution.

11. The system of claim 8, wherein the plurality of primary availability zones corresponds to three primary availability zones, and wherein the at least one allocation corresponding to an anticipated load resulting from a failover event corresponds to 50 percent and two allocations corresponding to 25 percent.

12. The system of claim 8, wherein the plurality of primary availability zones corresponds to four primary availability zones, and wherein the at least one allocation corresponding to an anticipated load resulting from a failover event corresponds to 33 percent and three allocations corresponding to 22 percent.

13. The system of claim 8, wherein the plurality of primary availability zones corresponds to five primary availability zones, and wherein the at least one allocation corresponding to an anticipated load resulting from a failover event corresponds to 25 percent and four allocations corresponding to 19 percent.

14. The system of claim 8, wherein generating processing results based on the collected performance metrics includes generating a notification regarding a characterization of validation of a configuration of the plurality of primary availability zones.

15. The system of claim 8, wherein generating processing results based on the collected performance metrics includes generating a recommendation regarding a remediation of a configuration of the plurality of primary availability zones.

16. The system of claim 8, wherein the system is further configured to perform a remediation operation response to the processing results.

17. A computer-implemented method for managing a group of availability zones wherein the group of availability zones is comprised of a plurality of availability zones designated as primary availability zones and wherein the plurality of availability zones receive client requests according to a uniform distribution allocation, the method comprising:
- implementing a non-uniform distribution allocation according to a redundancy model to collect performance metrics associated with the plurality of availability zones, wherein the redundancy model defines the non-uniform distribution allocation, wherein at least one allocation in the non-uniform distribution allocation corresponds to an anticipated load based resulting from a failover event, and wherein the implementation of the non-uniform distribution allocation according to the redundancy model is implemented prior to at least one of the plurality of primary availability zones experiencing the failover event; and
- generate processing results based on the collected performance metrics.

18. The method of claim 17, wherein generating processing results based on the collected performance metrics includes generating a notification regarding a characterization of validation of a configuration of the plurality of primary availability zones.

19. The method of claim 17 further comprising performing a remediation operation response to the processing results.

20. The method of claim 19, wherein performing a remediation operation response to the processing results includes at least one of increasing or decreasing capacity of the plurality of availability zones.

21. The method of claim 17, wherein the non-uniform distribution allocation corresponds to all non-zero allocations.

* * * * *